United States Patent [19]

Hidaka et al.

[11] Patent Number: 5,532,697

[45] Date of Patent: Jul. 2, 1996

[54] NON-CONTACT SPEED MEASURING APPARATUS FOR RAILROAD VEHICLE

[75] Inventors: Keiki Hidaka, Kamakura; Shigekatsu Uehara, Tokyo, both of Japan

[73] Assignees: Mitsubishi Precision Co., Ltd.; East Japan Railway Company, both of Japan

[21] Appl. No.: 478,821

[22] Filed: Jun. 7, 1995

[30] Foreign Application Priority Data

Jun. 9, 1994 [JP] Japan .................................... 6-127526
Mar. 28, 1995 [JP] Japan .................................... 7-069540

[51] Int. Cl.$^6$ .................................................. G01S 13/58
[52] U.S. Cl. .......................... 342/104; 342/108; 342/114; 342/115
[58] Field of Search .................................. 342/104, 108, 342/114, 115, 107

[56] References Cited

U.S. PATENT DOCUMENTS

| | | | |
|---|---|---|---|
| 4,107,680 | 8/1978 | Kaplan | 342/115 |
| 4,115,772 | 9/1978 | Valdes | 342/189 |
| 4,697,186 | 9/1987 | Rock | 342/189 |
| 5,448,243 | 9/1995 | Bethke et al. | 342/59 |
| 5,467,091 | 11/1995 | Watkins et al. | 342/159 |

FOREIGN PATENT DOCUMENTS

| | | |
|---|---|---|
| 2592959 | 7/1987 | France . |
| 2635952 | 2/1978 | Germany . |
| 1-321386 | 12/1989 | Japan . |
| 5-2492310 | 9/1993 | Japan . |
| 2259820 | 3/1993 | United Kingdom . |

OTHER PUBLICATIONS

"Spread Spectrum Systems With Commercial Applications", Robert C. Dixon, *Direct Sequence Systems*, 3rd Ed., pp. 18–33, 62–85, 114–133 and 158–193.

*Primary Examiner*—John B. Sotomayor
*Attorney, Agent, or Firm*—Merchant, Gould, Smith, Edell, Welter & Schmidt

[57] ABSTRACT

A speed measuring apparatus includes: a modulation circuit for carrying out a direct spread modulation with respect to a transmission carrier signal using coded two-phase random signals; an antenna unit for transmitting the modulated transmission carrier signal as a radio-wave toward an object and for receiving a reflected wave from the object; a demodulation circuit for demodulating a signal corresponding to the received reflected wave using the transmission carrier signal, to thereby generate intermediate frequency signals; a correlation circuit for making correlation between the intermediate frequency signals and signals each having the same code as that of the coded two-phase random signal and having a phase delayed by a predetermined time; a Doppler detecting unit for extracting from an output signal of the correlation circuit a Doppler frequency component contained in a signal which has been propagated by way of a propagation path existing in a specified distance range, and for generating speed information based on the extracted Doppler frequency component; and a computing unit for computing a movement distance and a position of the railroad vehicle over the whole track, on a real-time basis, using the generated speed information and fixed-point position information input from an outside of the apparatus. By the constitution, it is possible to precisely measure a speed of the railroad vehicle without being subject to the influence by a slip or glide of the wheels under any circumstances. It is also possible to specify a movement distance and position of the vehicle on a real-time basis.

11 Claims, 8 Drawing Sheets

NON-CONTACT SPEED MEASURING APPARATUS FOR RAILROAD VEHICLE

BACKGROUND OF THE INVENTION

1. Field of the Invention

The present invention relates to a technique, for measuring the speed of a vehicle, using radio-waves. More particularly, it relates to a non-contact speed measuring apparatus which is provided on a railroad vehicle and measures a speed of the vehicle so as to determine the movement distance and position thereof.

2. Description of the Related Art

As an example of the prior art by which the speed of a railroad vehicle is measured, a system using the output of a tachogenerator, which functions in connection with the rotation of a wheel, is known.

In such a system, the tachogenerator is coupled to an axle of the wheel, so as to output a plurality of alternating current signals per one rotation of the wheel. According to the system, since the diameter of the wheel is known, it is possible to measure the speed of the railroad vehicle and also to obtain information on the movement distance thereof.

However, the system poses a problem in that, where the speed of the vehicle is low, the ability of the tachogenerator is lowered and thus it is difficult to separate output components of the tachogenerator from noise components. This leads to a reduction in the reliability in the speed measurement. Also, where the friction force between the wheel and the rail is low, due to a rain or the like, a slip or glide of the wheel may occur, and thus the tachogenerator cannot carry out its normal operation. This results in a problem in that it is impossible to obtain a unified correlation between the movement distance of the vehicle and the speed thereof, and thus it is impossible to specify the real movement distance and position of the railroad vehicle.

As another example of the prior art by which a speed measurement of a railroad vehicle is carried out, a system using a frequency-modulated continuous wave (FM-CW system) is known.

For example, using a speed measuring apparatus provided on a railroad vehicle, a measurement of the speed of the railroad vehicle is carried out as follows. First, the apparatus transmits a frequency-modulated continuous wave (FM-CW) signal as a radio-wave from an antenna toward a corresponding track, and mixes a signal reflected from the track (i.e., receiving signal) with the transmitted signal. The apparatus then extracts from the mixed signal a signal containing a Doppler frequency component based on the speed relative to the track, and detects the Doppler frequency component to thereby measure the speed of the vehicle.

The FM-CW system is a non-contact system using radio-waves, and thus it is not subject to influences by a slip or glide of wheels as seen in the prior art system using a tachogenerator.

However, the FM-CW system poses a problem in that, where the reflection surface for propagation of the transmitted radio-wave lies in the close neighborhood of the transmission point, the measuring apparatus is subject to the influence by the reflection in the close neighborhood, and/or an influence by interference with the transmission signal or an interference signal in the receiving system or channel.

Also, where the reflection surface for propagation of the transmitted radio-wave lies far away from the transmission point, the influence by the spread of the radio-wave beam radiated from the antenna is averaged, and thus the center of power in the frequency band of the receiving signal can be uniquely determined. However, where the reflection surface lies in the close neighborhood, a problem occurs in that it is impossible to uniquely determine the center of power in the frequency band of the receiving signal since conditions of the reflection surface (e.g., the ground) cannot be ignored. This leads to a difficulty in a precise speed measurement with respect to the railroad vehicle.

SUMMARY OF THE INVENTION

An object of the present invention is to provide a non-contact speed measuring apparatus for a railroad vehicle, by which it is possible to precisely measure a speed of the railroad vehicle without being subject to influences by a slip or glide of wheels under any circumstances, and thus to specify a movement distance and position thereof on a real-time basis.

According to a first aspect of the present invention, there is provided an apparatus for measuring a speed of a railroad vehicle, the apparatus being provided on the railroad vehicle and including: an oscillator for generating a carrier signal for transmission; a code generator for generating a coded two-phase random signal for modulation; a modulation circuit for carrying out a direct spread modulation with respect to the transmission carrier signal using the generated coded two-phase random signal; an antenna unit for transmitting the modulated transmission carrier signal as a radio-wave toward an object and for receiving a reflection wave from the object; a demodulation circuit for demodulating a signal corresponding to the received reflection wave using the transmission carrier signal, to thereby generate an intermediate frequency signal; a correlation circuit for making correlation between the intermediate frequency signal generated by the demodulation circuit and a signal having the same code as that of the coded two-phase random signal for modulation and having a phase delayed by a predetermined time compared with the coded two-phase random signal for modulation; a Doppler detecting unit for extracting from an output signal of the correlation circuit a Doppler frequency component contained in a signal which has been propagated by way of a propagation path existing in a specified distance range, and for generating speed information based on the extracted Doppler frequency component; and a computing unit for computing a movement distance and a position of the railroad vehicle over the whole track, on a real-time basis, using the generated speed information and fixed-point position information input from an outside of the apparatus.

In a preferred aspect of the present invention, the antenna means includes first and second antennas having antenna patterns with different beam angles.

Also, in the preferred aspect of the present invention, the code generator generates two kinds of coded two-phase random signals with different phases, and each of the first and second antennas transmits and receives a signal modulated by a corresponding one of the two kinds of coded two-phase random signals. In this case, the Doppler detecting means extracts only a Doppler frequency component contained in a reflected wave from the overlapped area of each antenna pattern of the first and second antennas.

According to the above constitution of the present invention, the coded two-phase random signal contained in the wave reflected from the object (e.g., the railway track and the like) possesses a time difference corresponding to the propagation distance in which the radio-wave signal goes to and comes back from the object, relative to the coded two-phase random signal for modulation. Accordingly, the output based on a correlation between the two kinds of codes exhibits a peak value when the time difference (i.e., the phase difference) is equal to zero, and as the phase difference increases, the correlation output is accordingly lowered in level. When the phase difference exceeds the time corresponding to one clock period, the correlation output cannot be substantially obtained. The principle regarding a correlation between coded two-phase random signals is described, for example, in the publication entitled "SPREAD SPECTRUM SYSTEMS" by R. C. Dixon.

From the above, it will be appreciated that, when a correlation is made between the coded two-phase random signal contained in the reflection wave signal and another coded two-phase random signal delayed in advance by a time corresponding to the propagation distance, the phase difference becomes zero and thus the correlation output exhibits a peak value. Concretely, when the correlation is made between the intermediate frequency signal generated by the demodulation circuit and a signal having the same code as that of the coded two-phase random signal for modulation and having a phase delayed in advance by a time corresponding to the propagation distance, a correlation output obtained from a signal propagated in the preset propagation distance exhibits a peak value. However, with respect to a propagation distance other than the present propagation distance, no correlation output can be substantially obtained (see FIG. 2).

Therefore, the correlation circuit can output a specified signal which is free from the influences of a signal propagated over a propagation distance other than the present propagation distance (i.e., the influences of a reflection in the close neighborhood, or by an interference signal). The specified signal is input to the Doppler detecting means, where a Doppler frequency component is extracted from the signal. Then, based on the extracted Doppler frequency component, information on the speed of the railroad vehicle is generated.

Also, where the antenna means includes two antennas having antenna patterns with different beam angles, respectively, the output waveforms obtained through the correlation circuit from each antenna exhibit peak values, respectively, at different Doppler frequencies (see FIG. 3, frequencies $fd_1$, $fd_2$).

In this case, by spreading the spectra of the transmission signals of the two antennas using different two-phase random codes, respectively, and by inversely spreading the spectra of the receiving signals using the same code as that used in the transmission signals, it is possible to separate signals of each antenna pattern simultaneously and without any interference with each other, although the respective carrier signals for transmission are the same.

In this connection, it should be noted that, even if a reflected wave signal corresponding to a radio-wave signal radiated from one antenna is received at the other antenna, it is possible to remove any influence due to the receiving by the other antenna. This is because the respective coded two-phase random signals transmitted from the two antennas are sufficiently separated in phase from each other.

Also, Doppler frequency components contained in the receiving signal propagated in the overlapped area (see FIG. 4) of the two antenna patterns have the same phase and the same level, and thus they correspond to the overlapped portion (see FIG. 3, frequency $fd$) of the outputs of the respective correlation circuits. The Doppler frequency components are input to the Doppler detecting means, which in turn extracts only a Doppler frequency component contained in a signal which has been propagated by way of a specified propagation path. Thus, based on the extracted Doppler frequency component, it is possible to precisely measure a speed of the railroad vehicle.

Also, based on the measured speed information, it is possible to exactly specify the amount of movement per unit time of the railroad vehicle. Therefore, by properly inputting fixed-point position information from the outside of the apparatus, it is possible to determine a movement distance (starting from the fixed-point) of the railroad vehicle, on a real-time basis. At the same time, it is possible to exactly determine the position of the railroad vehicle over the whole track.

According to a second aspect of the present invention, there is provided an apparatus for measuring the speed of a railroad vehicle, the apparatus being provided on the railroad vehicle and including: a plurality of oscillators for generating carrier signals for transmission, respectively; a plurality of code generators provided for the plurality of oscillators, respectively, each generator generating a coded two-phase random signal for modulation; a plurality of modulation circuits provided for the plurality of code generators, respectively, each modulation circuit carrying out a direct spread modulation with respect to the transmission carrier signal generated from a corresponding oscillator, using the coded two-phase random signal generated from a corresponding code generator; a plurality of pairs of antennas provided for the plurality of modulation circuits, respectively, each pair of antennas transmitting the transmission carrier signal modulated by a corresponding modulation circuit as a radio-wave toward an object and receiving a reflected wave from the object; a plurality of demodulation circuits provided for the plurality of pairs of antennas, respectively, each demodulation circuit demodulating a signal corresponding to the reflection wave received at a corresponding pair of antennas, using the transmission carrier signal modulated by a corresponding modulation circuit, to thereby generate an intermediate frequency signal; a plurality of correlation circuits provided for the plurality of demodulation circuits, respectively, each correlation circuit making correlation between the intermediate frequency signal generated by a corresponding demodulation circuit and a signal having the same code as that of the coded two-phase random signal for modulation and having a phase delayed by a predetermined time compared with the coded two-phase random signal for modulation; a plurality of Doppler detecting units provided for the plurality of correlation circuits, respectively, each Doppler detecting unit extracting from an output signal of a corresponding correlation circuit a Doppler frequency component contained in a signal which has been propagated by way of a propagation path existing in a specified distance range, and generating speed information based on the extracted Doppler frequency component; and a computing unit for computing the movement distance and the position of the railroad vehicle over the whole track, on a real-time basis, using the speed information generated by the plurality of Doppler detecting units and fixed-point position information input from an outside of the apparatus, and wherein the plurality of pairs of antennas are provided such that at least one pair of antennas are arranged so as to radiate radio-wave beams with a predetermined angle toward the forward direction of the railroad vehicle relative to the object, and such that another pair of antennas are arranged so as to radiate radio-wave beams with the predetermined angle toward the backward direction thereof relative to the object.

According to the constitution of the second aspect of the present invention, even if the railroad vehicle travels with a shake or jolt on the track and thus is brought to a state in which the direction of a speed thereof does not coincide with the direction of a body axis thereof, the above predetermined angle with which radio-wave beams are radiated is constant. Accordingly, based on the predetermined angle, it is possible to precisely measure the speed of the railroad vehicle.

Also, the apparatus is provided to form a redundant constitution including each element (antenna, modulation circuit, demodulation circuit, and the like) in plural number. Accordingly, even if the speed measuring part of one system in the redundant constitution gets out of order for some causes, it is possible to continue the speed measurement of the railroad vehicle by properly utilizing the speed measuring parts of the other systems therein. Thus, although the precision in measurement is relatively lowered, it is possible to improve the reliability in measurement from a viewpoint of the continuous speed measurement. Also, the improvement in the reliability contributes to the safe transportation of passengers.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

Figure 1:
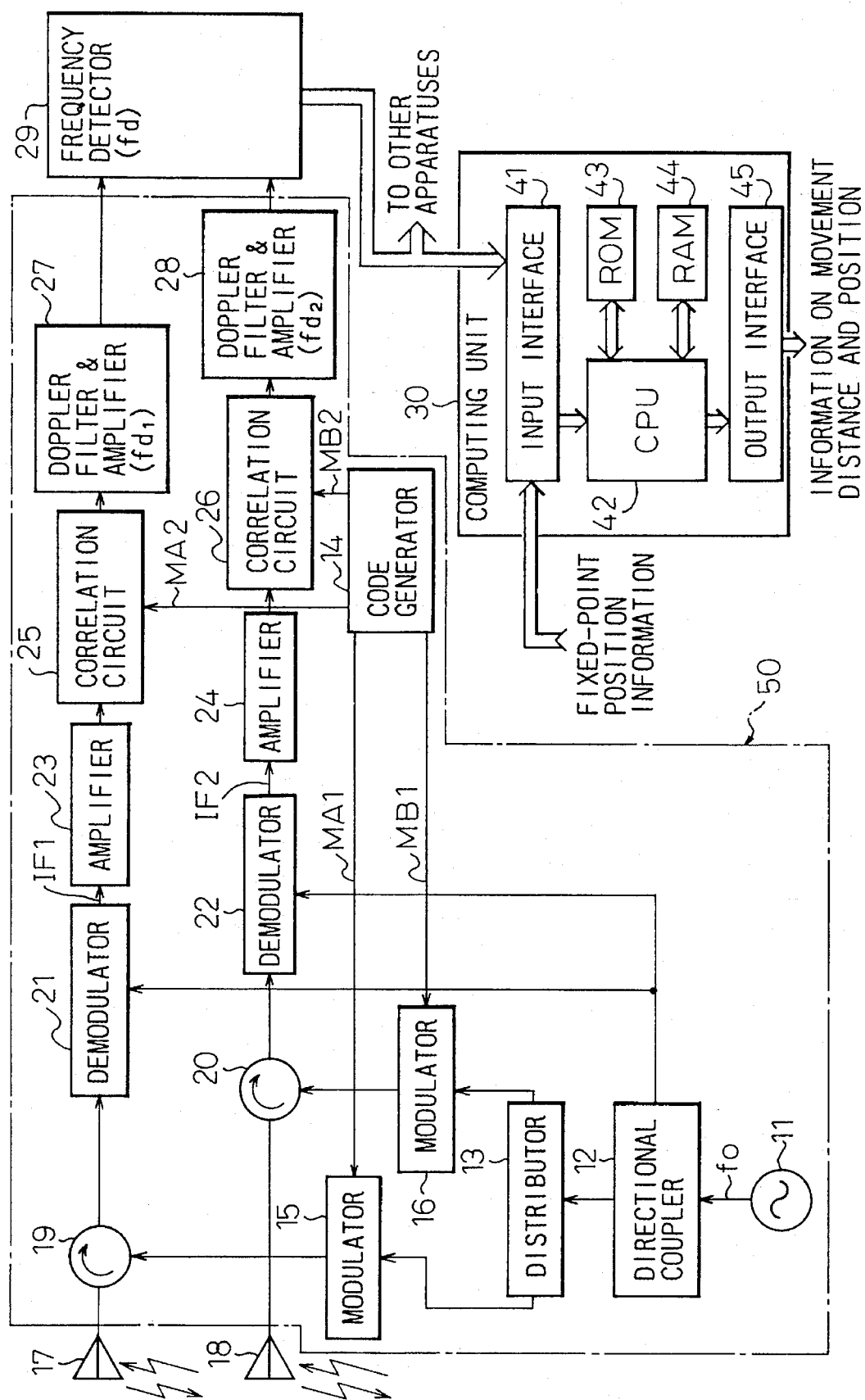
FIG. 1 is a block diagram showing the constitution of the non-contact speed measuring apparatus for a railroad vehicle according to a first embodiment of the present invention.
Figure 2:
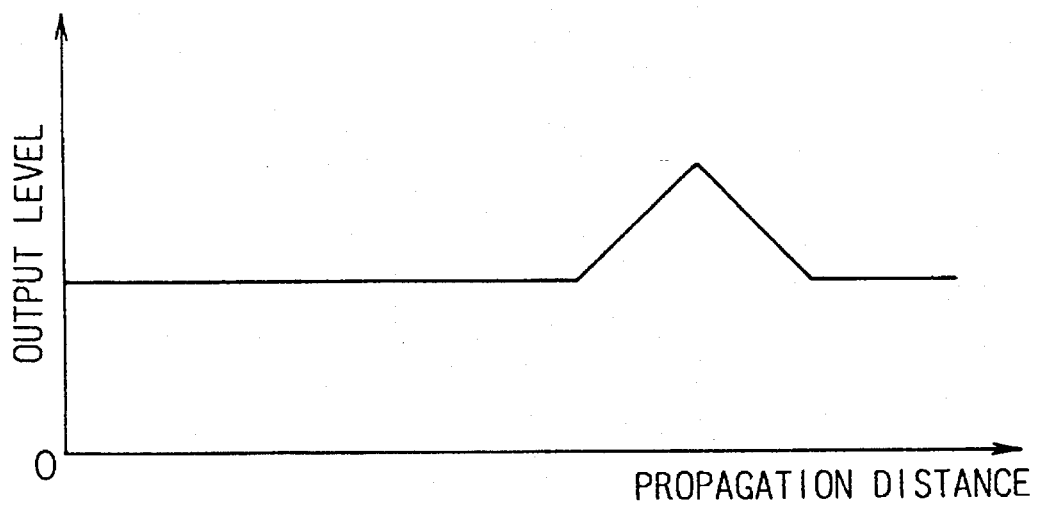
FIG. 2 is a diagram showing the relationship between the propagation distance of a radio-wave signal transmitted from each antenna shown in FIG. 1 and the output of each correlation circuit.
Figure 3:
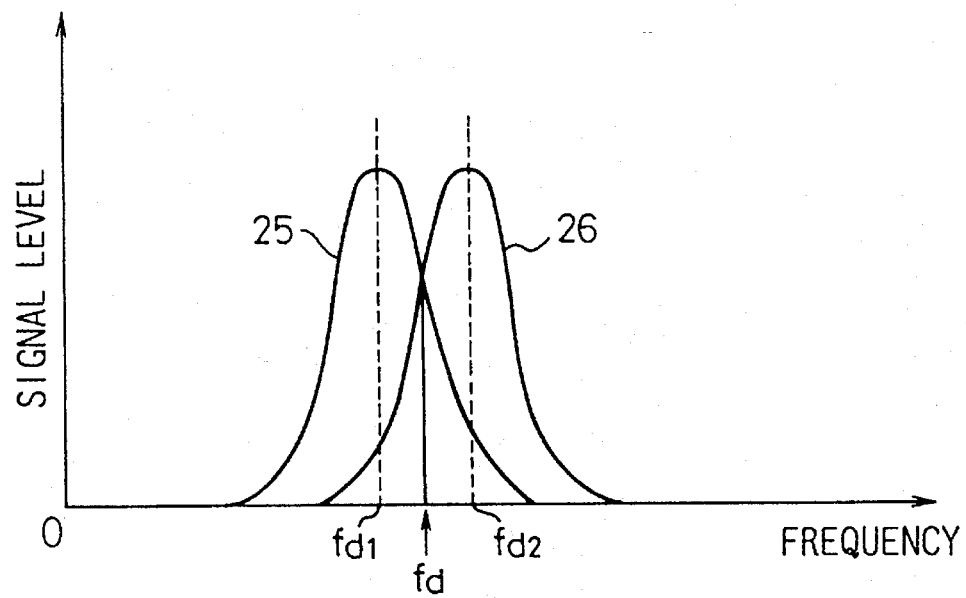
FIG. 3 is a waveform diagram of the output signals of each correlation circuit shown in FIG. 1.

FIG. 1 illustrates the constitution of the speed measuring apparatus for a railroad vehicle according to a first embodiment of the present invention.

In FIG. 1, reference 11 denotes an oscillator for generating a carrier signal fo for transmission; reference 12 a directional coupler for distributing an output fo of the oscillator 11 into two signals (i.e., a signal used for transmission, and a signal used for demodulation of receiving signals); reference 13 a distributor for distributing one output (signal used for transmission) of the directional coupler 12 into two channels; reference 14 a code generator for generating two kinds of variable coded two-phase random signals (modulation codes) MA1 and MB1; and references 15 and 16 each a modulator responsive to an output (modulation code MA1 or MB1) of the code generator 14 and to the transmission carrier signal fo fed via the directional coupler 12 and the distributor 13. The modulators 15 and 16 carry out a direct spread modulation with respect to the transmission carrier signal fo using the modulation codes MA1 and MB1, respectively.

Also, references 17 and 18 each denote an antenna for radiating a radio-wave beam toward an object (i.e., the ground containing a corresponding track) and for receiving reflection waves from the track and the like, for the radiated beam; references 19 and 20 each a circulator for feeding an output of the corresponding modulator 15, 16 to the corresponding antenna 17, 18 and for receiving a reflection wave signal received by the corresponding antenna; references 21 and 22 each a demodulator for mixing an output of the corresponding circulator 19, 20 with another output (signal used for the receiving signal demodulation, i.e., local signal) of the directional coupler 12, to thereby generate an intermediate frequency signal IF1, IF2; and references 23 and 24 each an amplifier for amplifying the output signal IF1, IF2 of the corresponding demodulator 21, 22.

Also, references 25 and 26 each denote a correlation circuit for making correlation between the output (intermediate frequency signal) of the corresponding amplifier 23, 24 and a corresponding coded two-phase random signal MA2, MB2 output from the code generator 14. In this case, each of the output signals MA2, MB2 of the code generator 14 is selected to have the same code as that of the coded two-phase random signals MA1, MB1 used for modulation and to have a phase delayed by a predetermined time compared with the coded two-phase random signals MA1, MB1. The predetermined time is set to be a time in which the radio-wave signal radiated from each antenna 17, 18 goes to and comes back from the object (i.e., the track and the like). Accordingly, each of the correlation circuits 25, 26 can output a specified frequency component contained in reflected waves from a certain limited region, i.e., a specified distance range.

Also, references 27 and 28 each denote a Doppler filter and amplifier for extracting from an output signal of the corresponding correlation circuits 25, 26 the specified frequency component (i.e., a Doppler frequency component contained in a signal which has been propagated by way of a propagation path existing in the specified distance range), and for amplifying a signal of the extracted Doppler frequency component. Reference 29 denotes a frequency detector for properly processing signals of two extracted Doppler frequency components $fd_1$ and $fd_2$, to thereby generate information on a speed of the railroad vehicle.

Also, reference 30 denotes a computing unit which computes the movement distance and the position of the railroad vehicle over the whole railway line, on a real-time basis, using the generated speed information and fixed-point position information input from an outside of the apparatus. The computing unit 30 is an on-board type unit in which a plurality of IC chips are mounted on a single board, and includes an input interface 41 for inputting the speed information and the fixed-point position information; a central processing unit (CPU) 42 for executing computation of the above movement distance and position based on the information input via the input interface 41; a read-only memory (ROM) 43 for storing programs defining the processings to be executed by the CPU 42; a random access memory (RAM) 44 for temporarily storing data processed by the CPU 42; and an output interface 45 for outputting results (i.e., information on the movement distance and position on a real-time basis) executed by the CPU 42 to the outside of the apparatus.

Note, a portion surrounded by a dot and dash line indicated by reference 50 (i.e., a portion including the constituent elements 11 to 16, and 19 to 28) is hereinafter referred to as a "transmission/reception (T/R) and spectrum-spread (SS) control unit".

Figure 5:
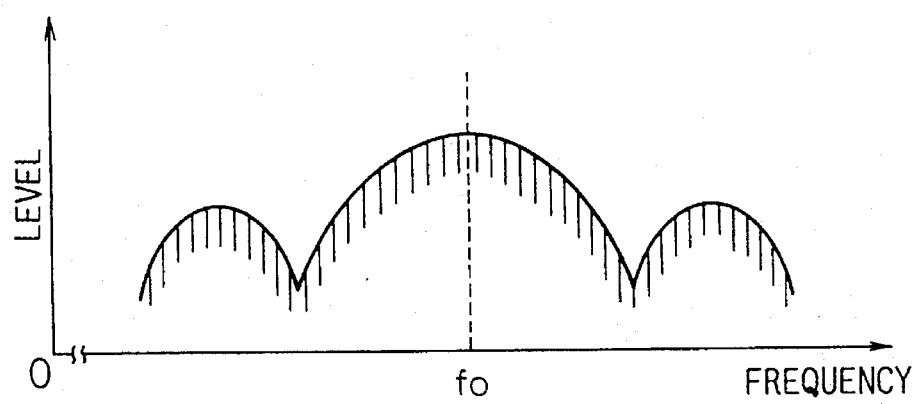
FIG. 5 is a waveform diagram of the radio-wave signal transmitted from each antenna shown in FIG. 1.

In the constitution of FIG. 1, the modulators 15 and 16 carry out a direct spread modulation with respect to the transmission carrier signal fo fed from the oscillator 11 via the directional coupler 12 and the distributor 13, using the coded two-phase random signals MA1 and MB1 fed from the code generator 14, respectively. The modulated transmission signals are fed via the circulators 19 and 20 to the antennas 17 and 18, respectively, and then are radiated in a spread state as shown in FIG. 5, from the respective antennas toward the track and the like.

Figure 6A:
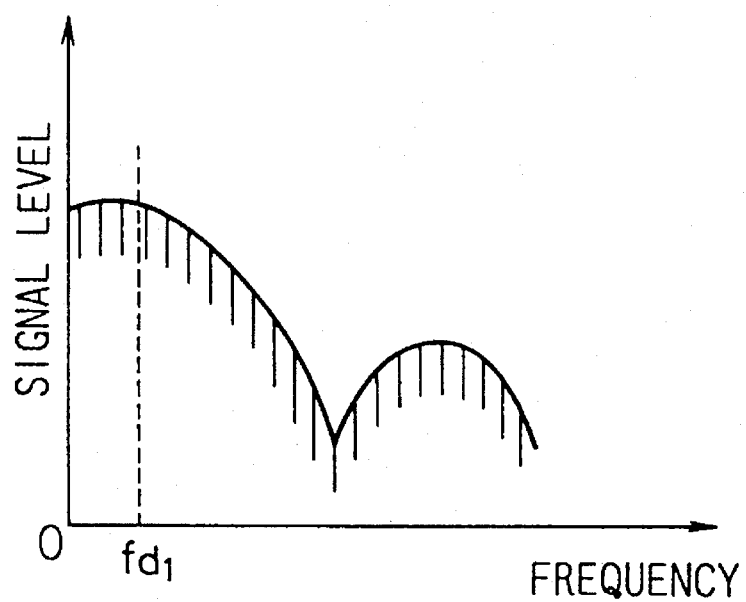
FIGS. 6a and 6b are waveform diagrams of the output signals of each demodulator shown in FIG. 1.
Figure 6B:
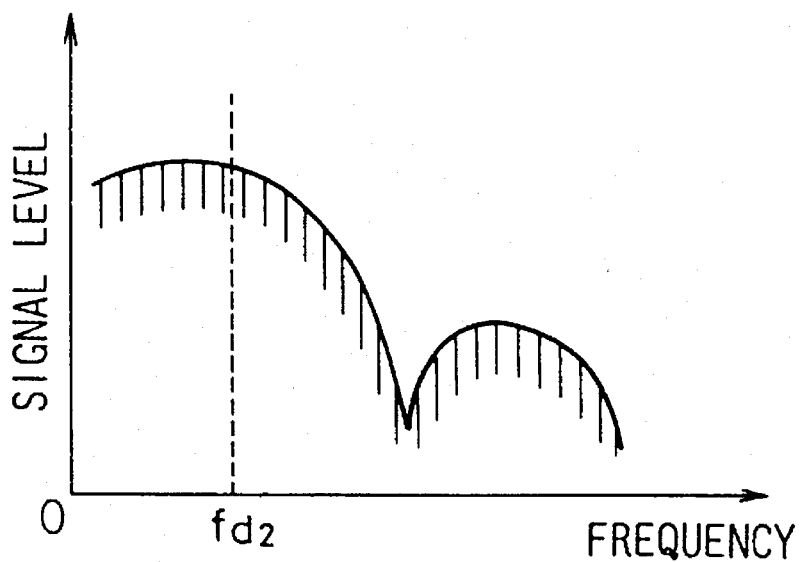

The reflection waves from the track and the like are received by the antennas 17 and 18, in a state containing influences by a reflection from the close neighborhood or an interference with the transmission signals or any interference signal in the receiving channel. The received signals are fed via the circulators 19 and 20 to the demodulators 21 and 22, respectively. The demodulators 21, 22 mix the receiving signals fed from the circulators 19, 20 with the local signal fed from the directional coupler 12, and thereby generate the intermediate frequency signals IF1 and IF2, respectively. Where Doppler frequency components contained in the signals received by the antennas 17 and 18 are represented by $fd_1$ and $fd_2$, respectively, the received signals are demodulated by the demodulators 21, 22, as shown in FIGS. 6a and 6b, respectively. The signals demodulated by the demodulators 21, 22 (i.e., intermediate frequency signals IF1, IF2) are amplified by the amplifiers 23 and 24, and then fed to the correlation circuits 25 and 26, respectively.

The correlation circuits 25, 26 make correlation between the receiving signals (i.e., intermediate frequency signals IF1, IF2) fed from the demodulators 21, 22 via the amplifiers 23, 24, and the coded two-phase random signals MA2, MB2 having the same code as that of the coded two-phase random signal MA1, MB1 and having a phase delayed by the predetermined time in which the radio-wave signal is propagated in the present propagation distance, and thereby output the Doppler frequency components ($fd_1$, $fd_2$) contained in the reflection waves from the specified distance range.

Figure 7A:
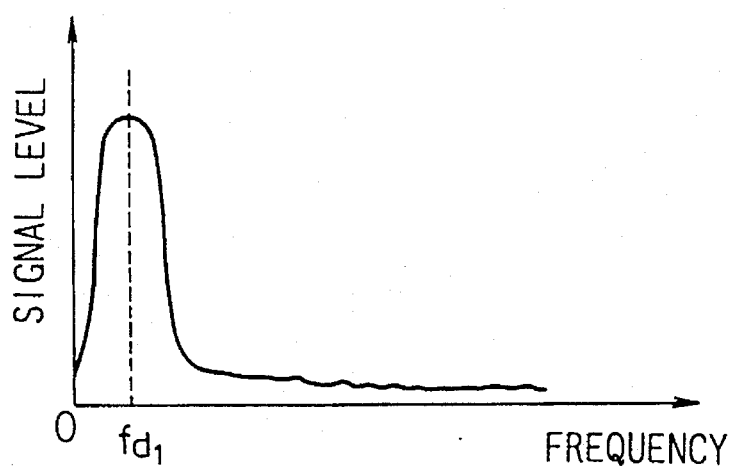
FIGS. 7a and 7b are waveform diagrams of the output signals of each Doppler filter and amplifier shown in FIG. 1.
Figure 7B:
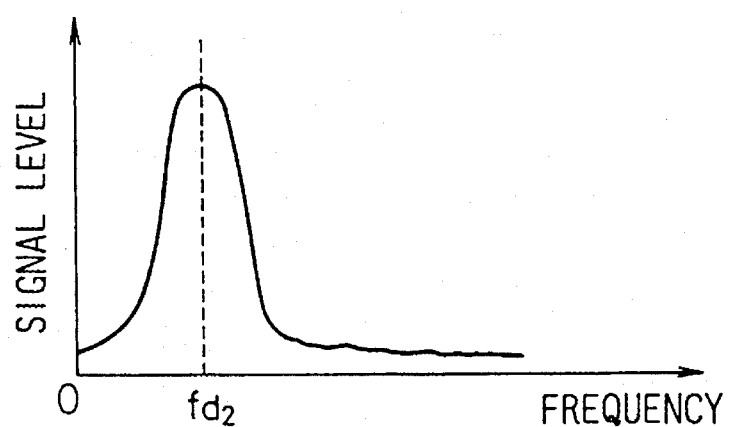
Figure 8:
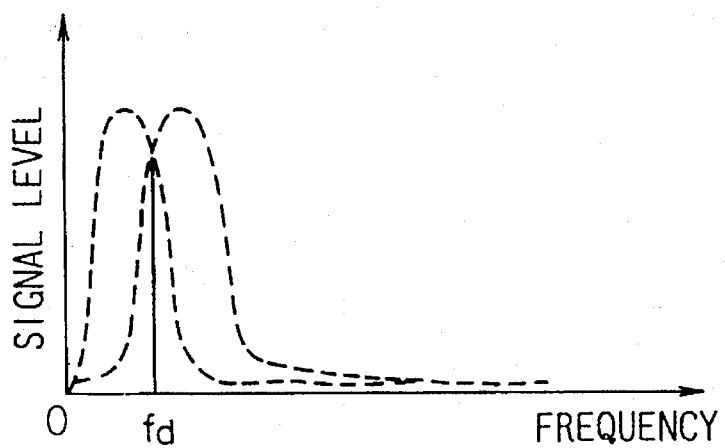
FIG. 8 is a waveform diagram of the output signal of the frequency detector shown in FIG. 1.

The signals containing the Doppler frequency components output from the correlation circuits 25, 26 are output through the Doppler filter and amplifiers 27, 28, as shown in FIGS. 7a and 7b, respectively, and then fed to the frequency detector 29. The frequency detector 29 extracts from the two extracted Doppler frequency components $fd_1$, $fd_2$ only a Doppler frequency component fd having the same phase and the same signal level, as shown in FIG. 8. Thus, a speed of the railroad vehicle is measured and information on the speed is generated.

Then, the generated speed information is fed to the computing unit 30, and to other apparatuses utilizing the speed information. The computing unit 30 receives fixed-point position information from the outside of the apparatus, adds a value converted into the quantity of movement per unit time based on the speed information, to a position information at the input of the fixed-point position information, and thereby computes a movement distance and a position of the railroad vehicle over the whole track, on a real-time basis. The computed result is output to the outside.

Concretely, the computing unit 30 accumulates the speed information generated by the frequency detector 29 for the unit time to thereby compute the amount of movement per unit time of the railroad vehicle. Then, the computing unit 30 accumulates the amount of movement per unit time, one by one, and converts the accumulated value into the quantity of movement on a real-time basis. To define "real-time", the above fixed-point position information is utilized. Namely, the "real-time" can be obtained by defining the time of input of the fixed-point position information as a base point. As a result, it is possible to continuously determine the movement distance of the railroad vehicle. Furthermore, by adding the movement distance to the fixed-point position information, it is possible to specify the position of the railroad vehicle over the whole track, on the real-time basis.

The above fixed-point position information may be directly input to the computing unit 30 by an operator of the railroad vehicle, or may be input to the computing unit 30 by an automatic system using an electromagnetic coupling means.

An example of the automatic system is a system which uses elements or units provided independently of the apparatus according to the present embodiment. The system includes a plurality of transponders provided with an arbitrarily set distance (e.g., 1 km, 10 km, . . . ) therebetween along the track, and a communication device provided on the railroad vehicle for transmission to and reception from each transponder. The communication device recognizes respective positions (i.e., fixed points) of each transponder while the vehicle travels on the track, and thereby inputs the respective positions as the fixed-point position information to the computing unit 30.

Another example of the automatic system is a system which shares part (oscillator 11, modulators 15, 16, antennas 17, 18, demodulators 21, 22, and the like) of the elements with the apparatus according to the present embodiment. The system is the same as the above automatic system in that it includes a plurality of transponders provided with an arbitrary distance therebetween along the track, and is different from the above automatic system in that it utilizes part of the elements of the present apparatus in place of the above communication device. Namely, according to this system, it is possible to incorporate information indicating the respective positions of each transponder into milli-wave signals transmitted and received by the antennas 17, 18. As a result, compared with the automatic system using a combination of the transponders and the communication device, it is possible to improve the precision in the measurement of position of the railroad vehicle (for example, below ±1 m in the case where the transponders are separated by a distance of 1 km).

As explained above, according to the speed measuring apparatus of the present embodiment, it is possible to precisely measure the speed of the railroad vehicle on which the present apparatus is provided, without being subject to influences by a slip or glide of wheels under any circumstances. Also, based on the measured precise speed information, it is possible to exactly specify the movement distance and the position of the railroad vehicle over the whole track, on a real-time basis.

Also, it is possible to arbitrarily set the distance between the present apparatus and a reflection surface such as the track, by suitably carrying out an initial setting of the phase difference between the coded two-phase random signals MA1, MB1 fed from the code generator 14 to the modulators 15, 16 and the coded two-phase random signals MA2, MB2 fed from the code generator 14 to the correlation circuits 25, 26.

Figure 4:
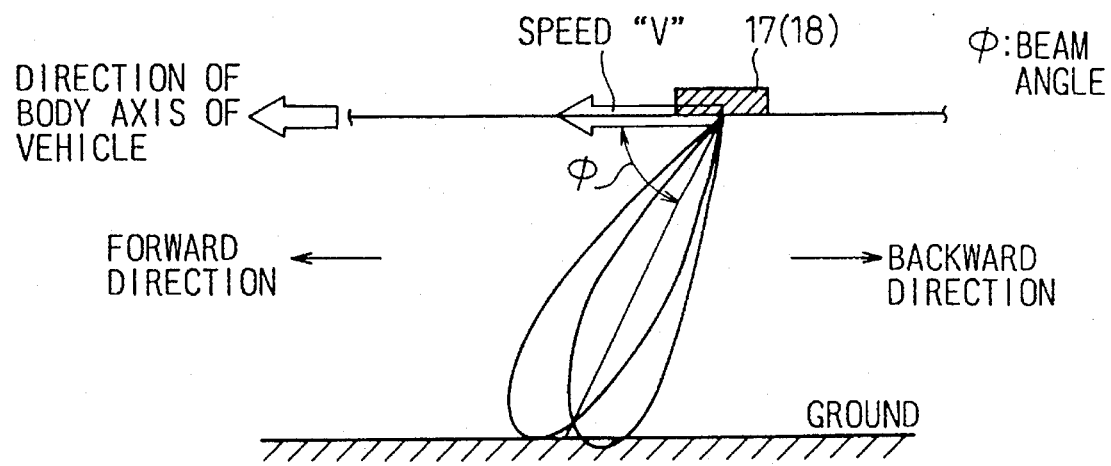
FIG. 4 is a diagram showing the antenna patterns of each antenna shown in FIG. 1.
Figure 11A:
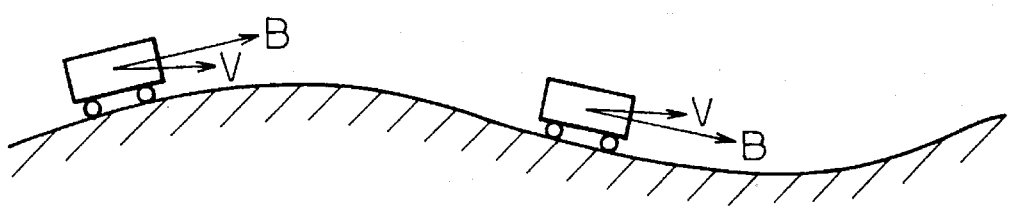
FIGS. 11a to 11c are explanatory diagrams of the mode of operation and effects obtained by the apparatus according to the embodiment of FIG. 9.

Although the speed measuring apparatus according to the first embodiment has been explained based on the premise that the railroad vehicle travels on the track without any substantial shaking or jolting relative to the direction of travel thereof (for example, as shown in FIG. 4, the case where the direction of travel of the vehicle (i.e., direction of the speed V) coincides with the direction of a body axis thereof), there actually occurs the case where the direction of the speed V does not coincide with the direction of the body axis of the vehicle due to ups and downs of the ground on which the railway is laid, or inclination thereof, or due to an inclination of the railroad vehicle per se (for example, see FIG. 11a). In this case, it is anticipated that the precision in the speed measurement of the railroad vehicle is lowered. This is for the reason below.

In FIG. 4, when a beam angle of the radio-wave beam radiated from each antenna 17, 18 is $\phi$ (this is defined by an angle between the direction of a cross point of the two antenna patterns and the direction of the speed V); a Doppler frequency extracted by the frequency detector 29 is fd; and a wavelength of the extracted signal is $\lambda$, the speed V to be measured is expressed by the following equation.

$$V = fd \cdot \lambda / (2 \cdot \cos\phi) \ldots \quad (1)$$

As is obvious from the equation (1), when the beam angle $\phi$ is constant, the speed V can be uniquely determined depending on the values of fd and $\lambda$ which are detected by the frequency detector 29. In actuality, however, there occurs the case where the direction of the speed V does not coincide with the direction of the body axis of the vehicle, as described above. Thus, the beam angle $\phi$ fluctuates resulting in a change in the speed V. A second embodiment of the present invention described below is intended to eliminate the above disadvantage.

Figure 9:
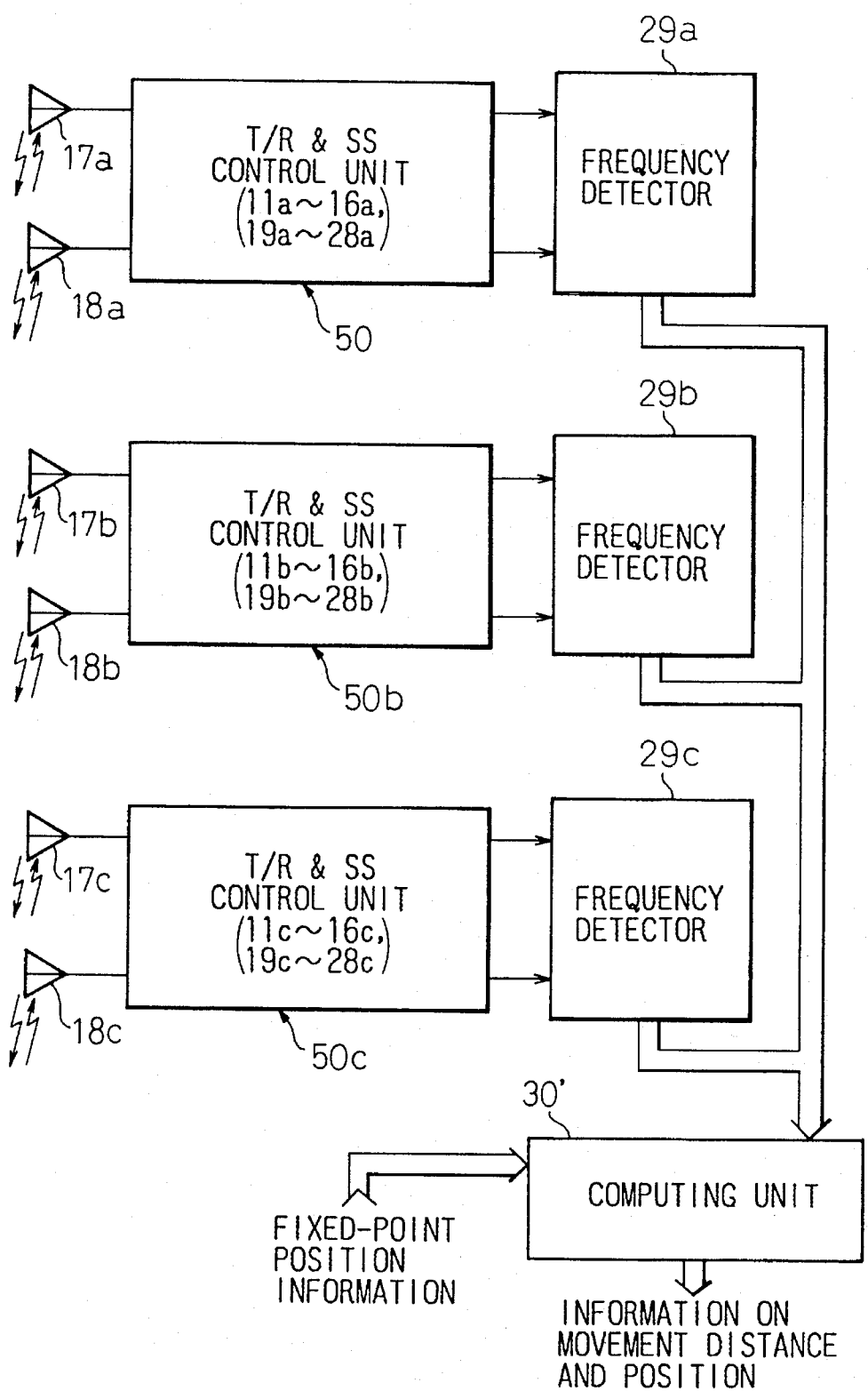
FIG. 9 is a block diagram showing the constitution of the non-contact speed measuring apparatus for a railroad vehicle according to a second embodiment of the present invention.
Figure 10A:
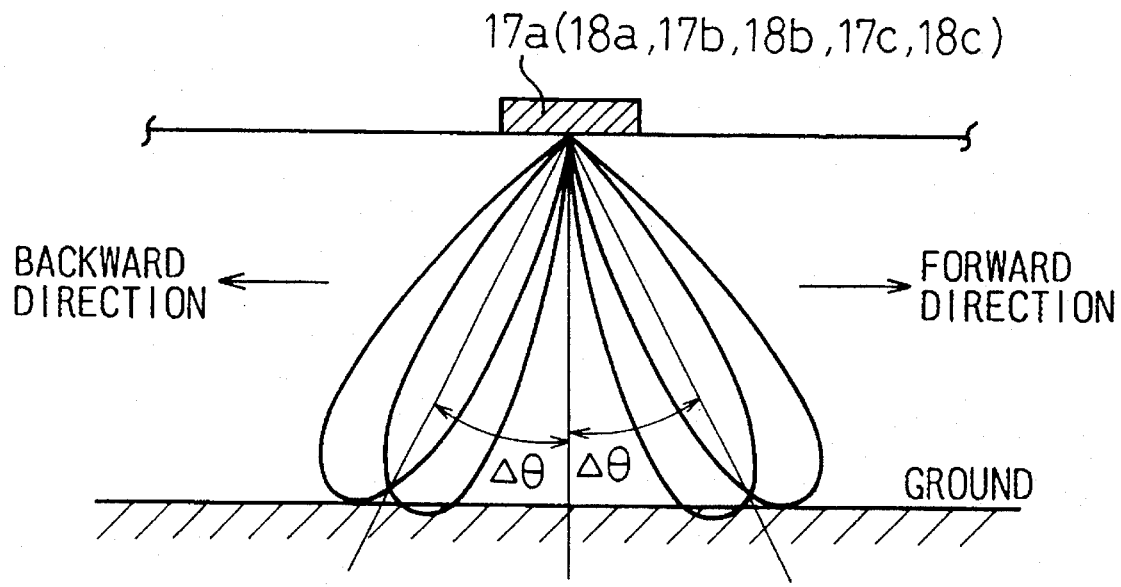
FIGS. 10a and 10b are diagrams showing the antenna patterns of each antenna shown in FIG. 9.
Figure 10B:
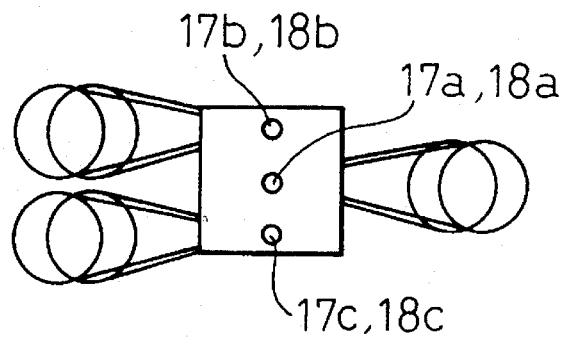

FIG. 9 illustrates the constitution of the speed measuring apparatus for a railroad vehicle according to the second embodiment of the present invention, and FIGS. 10a and 10b schematically show the antenna patterns of each antenna shown in FIG. 9.

The speed measuring apparatus according to the second embodiment is characterized in that three pairs of antennas 17a and 18a, 17b and 18b, and 17c and 18c, corresponding three T/R and SS control units 50a, 50b and 50c, and corresponding three frequency detectors 29a, 29b and 29c, are provided to form a redundant constitution, and in that as shown in FIGS. 10a and 10b, one pair of antennas 17a and 18a are arranged so as to radiate radio-wave beams at a predetermined angle $\Delta\theta$ toward the forward direction relative to the ground, while two pairs of antennas 17b and 18b, and 17c and 18c are arranged so as to radiate radio-wave beams with the angle $\Delta\theta$ toward the backward direction relative to the ground.

Also, respective speed information output from the frequency detectors 29a, 29b and 29c are input to a computing unit 30'. The constitution and mode of operation of the computing unit 30' are the same as those of the computing unit 30 in the first embodiment, and thus the explanation thereof is omitted.

According to the constitution of the apparatus according to the second embodiment, effects described below can be obtained, in addition to the effects obtained by the apparatus according to the first embodiment.

Figure 11B:
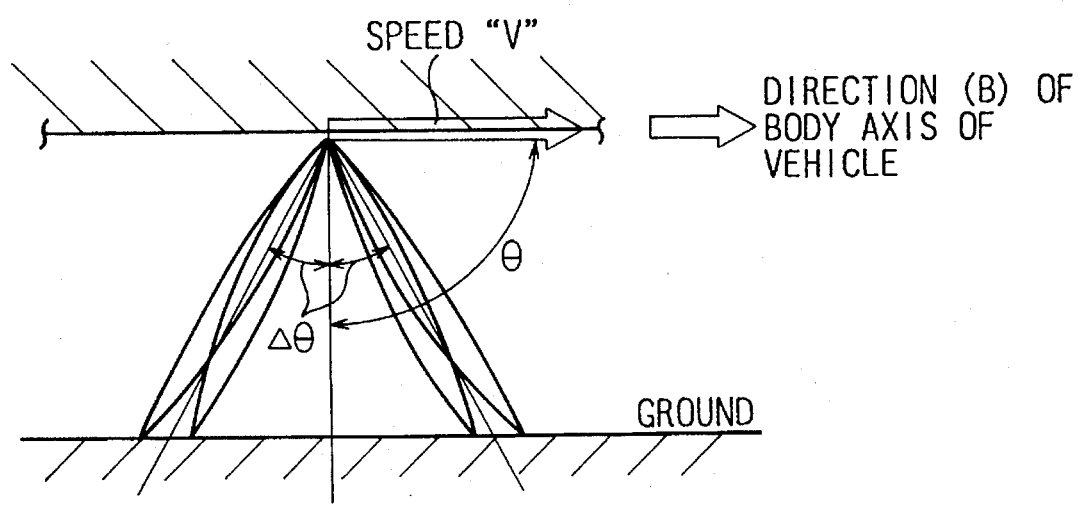
Figure 11C:
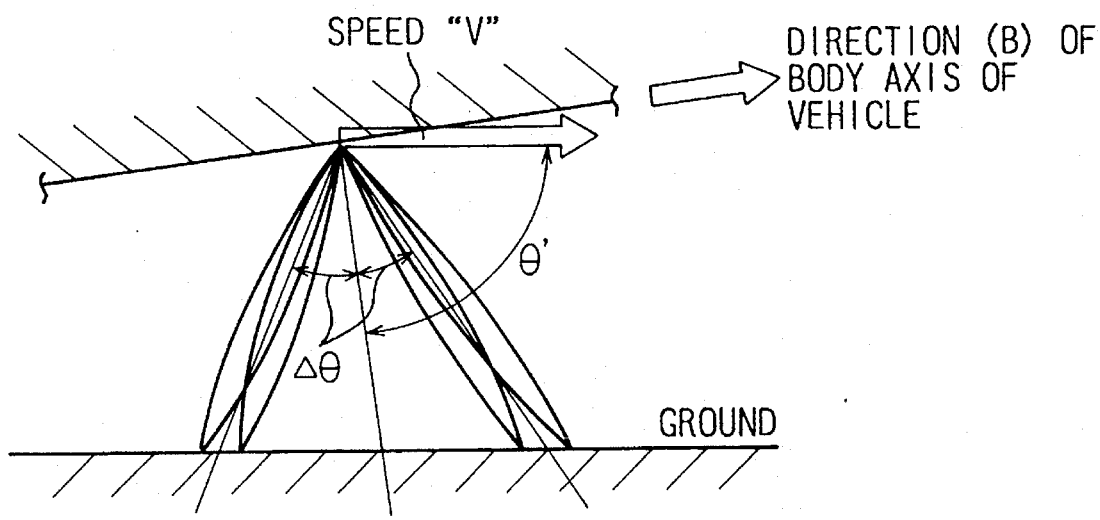

First, even if the railroad vehicle travels with a shake or jolt on the track as shown in FIG. 11a, and the beam angle is changed from $\theta$ to $\theta'$ as shown in FIGS. 11b and 11c, an angle between the forward-direction beam and the backward-direction beam is constant($2 \times \Delta\theta$), and thus it is possible to precisely measure the speed V of the railroad vehicle based on the constant angle.

Also, even if the speed measuring part of one system including one pair of antennas gets out of order for some causes, it is possible to continue the speed measurement of the railroad vehicle by properly utilizing the speed measuring parts of the other two systems including two pairs of antennas. Thus, although the precision in measurement is relatively lowered, it is possible to improve the reliability in measurement from a viewpoint of the continuous speed measurement. Also, the improvement in the reliability contributes to safe transportation of passengers.

What is claimed is:

1. An apparatus for measuring a speed of a railroad vehicle, the apparatus being provided on the railroad vehicle and comprising:

an oscillator for generating a carrier signal for transmission;

a code generator for generating a coded two-phase random signal for modulation;

a modulation circuit for carrying out a direct spread modulation with respect to said transmission carrier signal using said generated coded two-phase random signal;

antenna means for transmitting said modulated transmission carrier signal as a radio-wave toward an object and for receiving a reflected wave from the object;

a demodulation circuit for demodulating a signal corresponding to said received reflected wave using said transmission carrier signal, to thereby generate an intermediate frequency signal;

a correlation circuit for making correlation between said intermediate frequency signal generated by said demodulation circuit and a signal having the same code as that of said coded two-phase random signal for modulation and having a phase delayed by a predetermined time compared with said coded two-phase random signal for modulation;

a Doppler detecting means for extracting from an output signal of said correlation circuit a Doppler frequency component contained in a signal which has been propagated by way of a propagation path existing in a specified distance range, and for generating speed information based on the extracted Doppler frequency component; and a computing means for computing a movement distance and a position of said railroad vehicle over the whole track, on a real-time basis, using said generated speed information and fixed-point position information input from an outside of said apparatus.

2. The apparatus as set forth in claim 1, wherein said antenna means comprises first and second antennas having antenna patterns with different beam angles, respectively.

3. The apparatus as set forth in claim 2, wherein said code generator generates two kinds of coded two-phase random signals with different phases, and each of said first and second antennas transmits and receives a signal modulated by a corresponding one of the two kinds of coded two-phase random signals, and wherein said Doppler detecting means extracts only a Doppler frequency component contained in a reflection wave from an overlapped area of each antenna pattern of said first and second antennas.

4. The apparatus as set forth in claim 3, wherein said code generator comprises means for giving a delay of said predetermined time to the generated two kinds of coded two-phase random signals, respectively, the delay of said predetermined time being selected to be a time in which each of radio-wave signals radiated from said first and second antennas goes to and comes back from said object.

5. The apparatus as set forth in claim 1, further comprising circulating means for feeding said modulated transmission carrier signal to said antenna means and for feeding said reflected wave signal received by the antenna means to said demodulation circuit.

6. The apparatus as set forth in claim 1, wherein said fixed-point position information is directly input to said computing means by an operator of said railroad vehicle.

7. The apparatus as set forth in claim 1, wherein said fixed-point position information is input to said computing means by an electromagnetic coupling means, the electromagnetic coupling means being constituted by a plurality of first communication means provided with an arbitrarily set space therebetween along said track, and a second communication means provided on said railroad vehicle for transmission to and reception from each of said plurality of first communication means, and wherein said second communication means recognizes respective positions of said plurality of first communication means while the railroad vehicle travels on the track, to thereby generate said fixed-point position information.

8. The apparatus as set forth in claim 1, wherein said fixed-point position information is input to said computing means by an electromagnetic coupling means, the electromagnetic coupling means being constituted by a plurality of communication means provided with an arbitrarily set space therebetween along said track, and a unit for communication with said plurality of communication means, the unit including said oscillator, said modulation circuit, said antenna means, and said demodulation circuit.

9. An apparatus for measuring a speed of a railroad vehicle, the apparatus being provided on the railroad vehicle and comprising:

a plurality of oscillators for generating carrier signals for transmission, respectively;

a plurality of code generators provided for said plurality of oscillators, respectively, each generator generating a coded two-phase random signal for modulation;

a plurality of modulation circuits provided for said plurality of code generators, respectively, each modulation circuit carrying out a direct spread modulation with respect to the transmission carrier signal generated from a corresponding oscillator, using the coded two-phase random signal generated from a corresponding code generator;

a plurality of pairs of antennas provided for said plurality of modulation circuits, respectively, each pair of antennas transmitting the transmission carrier signal modulated by a corresponding modulation circuit as a radio-wave toward an object and receiving a reflected wave from the object;

a plurality of demodulation circuits provided for said plurality of pairs of antennas, respectively, each demodulation circuit demodulating a signal corresponding to the reflection wave received at a corresponding pair of antennas, using the transmission carrier signal modulated by a corresponding modulation circuit, to thereby generate an intermediate frequency signal;

a plurality of correlation circuits provided for said plurality of demodulation circuits, respectively, each correlation circuit making correlation between the intermediate frequency signal generated by a corresponding demodulation circuit and a signal having the same code as that of said coded two-phase random signal for modulation and having a phase delayed by a predetermined time compared with the coded two-phase random signal for modulation;

a plurality of Doppler detecting means provided for said plurality of correlation circuits, respectively, each Doppler detecting means extracting from an output signal of a corresponding correlation circuit a Doppler frequency component contained in a signal which has been propagated by way of a propagation path existing in a specified distance range, and generating speed information based on the extracted Doppler frequency component; and a computing means for computing a movement distance and a position of said railroad vehicle over the whole track, on a real-time basis, using the speed information generated by said plurality of Doppler detecting means and fixed-point position information input from an outside of said apparatus, and wherein said plurality of pairs of antennas are provided such that at least one pair of antennas are arranged so as to radiate radio-wave beams with a predetermined angle toward the forward direction of said railroad vehicle relative to said object, and such that another pair of antennas are arranged so as to radiate radio-wave beams with the predetermined angle toward the backward direction thereof relative to the object.

10. The apparatus as set forth in claim 9, wherein said each pair of antennas have antenna patterns with beam angles different from each other.

11. The apparatus as set forth in claim 9, further comprising circulating means for feeding the transmission carrier signal modulated by a corresponding modulation circuit to a corresponding pair of antennas and for feeding the reflected wave signal received by the corresponding pair of antennas to a corresponding demodulation circuit.

* * * * *